United States Patent
Acker et al.

(10) Patent No.: US 6,187,720 B1
(45) Date of Patent: Feb. 13, 2001

(54) DELAYED RELEASE BREAKERS IN GELLED HYDROCARBONS

(76) Inventors: David B. Acker, 23 BerryFrost La., Woodlands, TX (US) 77380; Fati Malekahmadi, 7400 Bellerive, Houston, TX (US) 77036

( * ) Notice: Under 35 U.S.C. 154(b), the term of this patent shall be extended for 0 days.

(21) Appl. No.: 09/430,935

(22) Filed: Nov. 1, 1999

(51) Int. Cl.[7] ............... C09K 3/00; E21B 43/26
(52) U.S. Cl. ............ 507/238; 507/269; 507/902; 507/921; 507/922; 166/308
(58) Field of Search ............ 507/238, 902, 507/921, 922, 269; 166/308

(56) References Cited

U.S. PATENT DOCUMENTS

| | | | |
|---|---|---|---|
| 4,770,796 | * 9/1988 | Jacobs | 507/921 |
| 4,919,209 | * 4/1990 | King | 166/308 |
| 5,110,486 | * 5/1992 | Manalastas et al. | 507/921 |
| 5,164,099 | * 11/1992 | Gupta et al. | 507/902 |
| 5,649,596 | * 7/1997 | Jones et al. | 507/238 |
| 5,948,735 | * 9/1999 | Newlove et al. | 507/238 |

* cited by examiner

Primary Examiner—Philip Tucker
(74) Attorney, Agent, or Firm—R. L. Graham

(57) ABSTRACT

Granules composed of a particulate breaker chemical dispersed in a wax matrix are used in fracturing operations to break hydrocarbon liquids gelled with salts of alkyl phosphate esters. The wax granules are solid at surface temperature and melt or disperse in the hydrocarbon liquid at formation temperature releasing the breaker chemical to react with gelling agent.

16 Claims, 2 Drawing Sheets

DELAYED RELEASE BREAKERS IN GELLED HYDROCARBONS

FIELD OF INVENTION

The present invention relates generally to the treatment of subterranean formations using gelled hydrocarbons. In one aspect, it relates to the use of breaker chemicals in gelled oil-base fracturing fluids. In another aspect, the invention relates to the use of granules containing breaker chemicals in fracturing operations.

DESCRIPTION OF THE PRIOR ART

Hydraulic fracturing has been widely used as a means for improving the rates at which fluids can be injected into or withdrawn from subterranean formations surrounding oil wells and similar boreholes. The methods employed normally involve the injection of a viscous fracturing fluid having a low fluid loss value into the well at a rate sufficient to generate a fracture in the exposed formation, the introduction of fluid containing suspended propping agent particles into the resultant fracture, and the subsequent shutting in of the well until the formation has closed on the injected particles. This results in the formation of high conductivity channels through which fluids can be injected or produced. The conductivity in the propped fracture is a function of the fracture dimensions and the permeability of the bed of propping agent particles within the fracture.

In order to generate the fracture of sufficient length, height, and width, and also to carry the propping agent particles into the fracture, it is necessary for the fluid to have relatively high viscosity. This requires the use of gelling agents in the fracturing fluid.

Fracturing fluids are either water-based liquids (gelled with water-soluble polymers) or oil-based liquids (gelled with in-situ formed reversible networks). The water-based liquids cannot be used in the fracturing of many water sensitive formations. Fracturing in these formations requires the oil-based liquids.

As with all fracturing fluids, the gel or viscosity of the fracturing fluid must be retained for sufficient time to generate the fracture and place the proppant therein, but must eventually be "broken" to permit the well to cleanup. The fracturing fluid accordingly will generally incorporate a "delayed breaker" which after a predetermined time or event, activates the breaker to degrade the polymer or gelling a gent. Water-based "breakers" are described in SPE paper 18862. Breakers for oil-based systems are more varied because of the differences in the hydrocarbon viscosifiers.

The breaker used in accordance with the present invention is for pH sensitive oil-based gelling agents. By far the most common gelling agents, which exhibit pH sensitivity, are the phosphate gelling agents. These well-known and commercially available gelling agents for oil-based systems are alkyl phosphate esters.

Breaker chemicals useful in oil-based systems include sodium bicarbonate (U.S. Pat. No. 4,877,894), calcium hydroxide, and magnesium hydroxide, and similar bases.

The breaker chemicals may be encapsulated and activated by a variety of mechanisms including crushing by formation closure (U.S. Pat No. 4,506,734), and dissolution by formation fluids (U.S. Pat. No. 4,741,401 and U.S. Pat. No. 5,110,486, U.S. Pat. No. 4,919,209 and U.S. Pat No. 5,649,596).

U.S. Pat. No. 3,163,219 discloses water insoluble agents such as rosin asphalts and waxes used as binding agents for sulfur and calcium sulfate gel breakers for water-based systems.

SUMMARY OF THE INVENTION

The method of the present invention involves the use of wax granules containing a particulate gel breaker which are introduced into an oil-based fracturing fluid and function as delayed breakers in the fracturing operation. The granules exhibit a delayed release of the active chemical (gel breaker) so the degradation or the breaking down of the gelled structure occurs well after the fracturing fluid has been pumped into the formation. Moreover, the breakers display the desired activity within reasonable time periods so that long shut-in times are not required.

The preferred gelling agents for oil-based liquids are the metal salts of alkyl or orthophosphate esters. These gelling agents are effective viscosifiers in a wide range of oil types and are most effective when neutralized (i.e. no excess presence of base or acid). In the presence of excess base or acid, the gelled structure is destroyed and the viscosity of the fracturing fluid is reduced. Acids and bases thus can be used to break the phosphate ester gelling agents. The present invention relies on this mechanism for breaking gels, and employs granules containing the base or acid.

The oil gelled with phosphate ester gelling agents are effective in the absence of excess base or acid. This requires the apparent pH of the liquid to be in the neutral range. In adding the gelling agent to the oil, the pH need not be measured because sufficient gelling of the oil inherently requires the absence of excess base or acid.

The addition of the base or acid provides the apparent pH change necessary to break the gelled structure.

DESCRIPTION OF THE PREFERRED EMBODIMENTS

Figure 1:
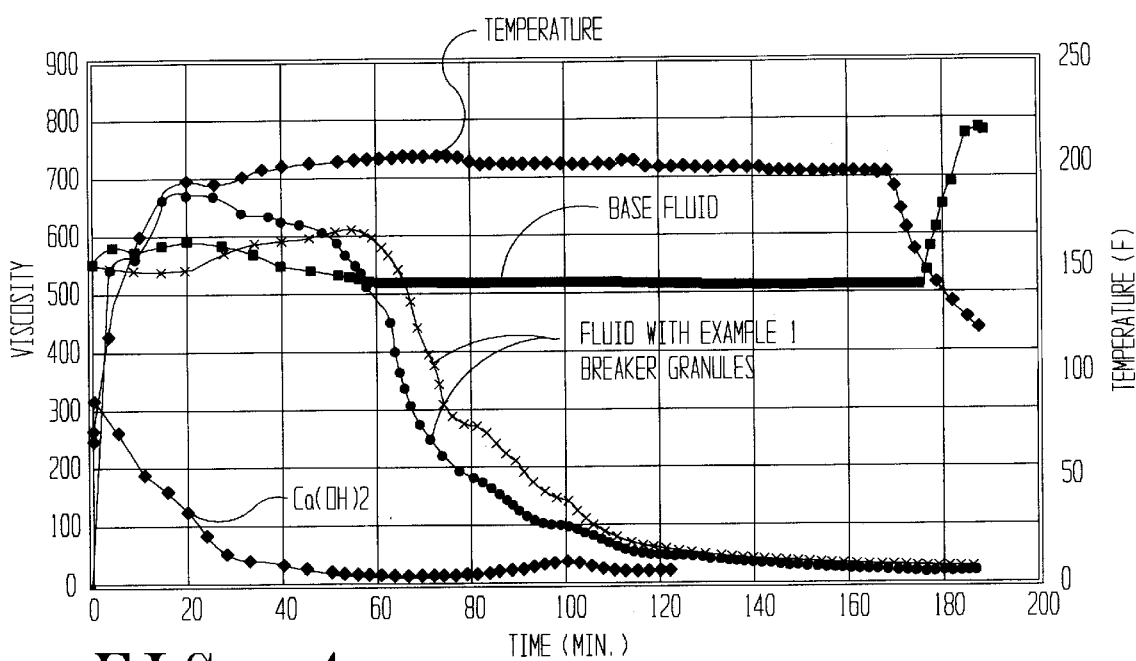
FIGS. 1 through 4 are plots of viscosity versus time for the various fluids tested illustrating the fracture fluid breaking characteristics at increased temperatures.

The present invention is described and exemplified in connection with the preferred embodiments describing the use of a base chemical dispersed in a wax matrix and preferably in wax granules for breaking alkyl phosphate ester gelling agents. It is to be understood, however, that the invention in its broadest concept contemplates the use of acids and bases dispersed in the wax granules. The preferred embodiment is described with specific references to (a) the type of liquid to be gelled, (b) the gelling agent, (c) the "breaker" granules, and (d) operations.

(a) Liquids

The hydrocarbon liquid for the fracturing fluid may be any of those currently used in such operations. These include crude oil, refined oil, diesel oil, fuel oil, condensates, and the like. Because of the low cost and availability, crude oil and diesel oil are the most common oils used in oil-based fracturing systems.

(b) Gelling Agents

As indicated above, the gelling a gent must be capable of increasing the viscosity of the oil and must be pH sensitive. That is, the viscosity increase is optimum at or near neutral acidity. The addition of base "breaker" chemical will provide excess base, which causes the gelling agent to degrade, destroying its network structure in the oil. This returns the oil to a low viscosity (ungelled) state, permitting the well cleanup.

The metal salts of partially esterified phosphates are known to be pH sensitive (Jelling agents. See, for example, U.S. Pat. No. 4,877,894 which discloses a commercial alkyl phosphate acid-ester marketed as "ASP-160", by Nalco Chemical Company (now known as Nalco Exxon Energy Chemicals, L.P.). This patent also discloses an improved alkyl phosphate ester geller and a delayed "breaking agent" (sodium bicarbonate). The disclosure of U.S. Pat. No. 4,877,894 is incorporated herein by reference.

Specific alkyl phosphate ester gelling agents include C3–C18 (preferably C6–C 10) alkyl diester acids, C8–C10 alkyl diester acid, mixtures of the above, and analogous mono and diesters. These additives are known in the industry, and many are commercially available. The gelled structure in the oil is developed by mixing the alkyl phosphate ester with a basic aluminum component such as sodium aluminate, selected aluminum alkoxides, and aluminum acetate. Sodium aluminate is the preferred base compound.

One method for making alkyl phosphate esters or diesters involves reacting aliphatic alcohols having 3 to 18 (preferably 6 to 10) carbon atoms with phosphorus pentoxide. The phosphate intermediate then may interchange its ester groups with triethyl phosphate producing a more broad distribution of alkyl phosphate esters.

(c) Granules

The granules may be compounded from two main ingredients: (1)wax, or wax blends and (2) a particulate or powdered alkaline compound (base).

The wax may be natural or synthetic and must possess the following properties:

(1) Capable of being compounded or mixed with the particulate base to produce free-flowing, substantially non-tacky granules.

(2) Substantial oil insolubility or oil impermeability.

(3) The wax or wax blends must release the breaker chemical at or near formation temperature.

The preferred wax generally will be selected from the following different classes: natural paraffin, and natural microcrystalline wax, synthetic waxes of polyethylene and polymethylene. The natural paraffin and microcrystalline waxes are present in crude oil and are seperated in a refinery. The paraffins are separated from the lube oils and are straight chain hydrocarbons having a melt point typically of about 120 to 160 degrees F. Microcrystalline wax is separated from the asphalts and is higher in molecular weight than paraffin wax and its molecular structure is more branched. Microcrystalline wax has a typical melt point of about 150 to 190 degrees F. Synthetic waxes are produced from syngas using the Fischer-Tropsch process and consist of polyethylene and polymethylene waxes. Synthetic waxes are mixtures of saturated straight-chain paraffin hydrocarbons. They are similar in structure to petroleum paraffin waxes, though their higher molecular weights result in higher melting points and greater hardness. The melt point of some synthetic waxes can approach 250 degree F. The properties of synthetic waxes can further be modified with hydrotreating.

Natural and synthetic waxes are commercially available from a number of manufacturers, some of which include Moore & Munger, Inc. and HP Wax Company. More specifically for example Moore & Munger, Inc., markets a line of synthetic waxes under the Paraflint tradename. This product line consists of synthetic waxes made with the Fischer-Tropsch process using syngas produced from coal. The various grades of Paraflint range in melt points from about 175 to 230 degrees F.

The wax portion of the granules may contain one grade of wax or a blend of various grades. The grade of wax or blend of waxes is determined by the temperature of the subterranean formation being treated so as to provide adequate delay of the release of the base chemical to allow for proper placement of the fracturing fluid.

The base may be any finely divided compound capable of being dispersed in the wax and capable of disrupting the network structure of the gelling agent. The base preferably should have a particle size of less than 1000 microns and most preferably less than 500 microns (powder). The preferred bases are powdered calcium hydroxide, magnesium oxide, sodium bicarbonate, and urea, with calcium hydroxide being the most preferred.

The preferred granules for use in the method of the present invention comprise a wax or wax blend of varied crystalline melting points, having particulate acid or base distributed therein.

In the preferred embodiment, the granules comprise 40 to 90 wt % of a wax or a blend of two or more waxes; and 10 to 60 wt % of a particulate base such as $Ca(OH)_2$ It is preferred that the particulate base comprises at least 10 wt % of each granule. In the most preferred embodiment, the particulate base will comprise at least 30 wt % of each granule.

The particulate wax granules must have a particle size range suitable for fracturing operations. The acid or base is dispersed throughout the wax matrix and is released as the granules display flow at or near the wax's melting transition. Experiments indicate that the release of the particulate base is due to the wax melting at or near formation temperature or the wax dispersing in the hydrocarbon liquid at or near formation temperature. The wax matrix decomposes and the breaker is released to reduce the viscosity of the gelled fluid. The proper selection of wax or wax blend is made based on the formation temperature.

The preferred wax or wax blend consists of various melt point fractions of synthetic waxes of polymethylene and polyehtylene.

The base is preferably a finely divided (i.e. powdered) chemical and includes calcium hydroxide, magnesium oxide, calcium oxide and mixtures of these. The preferred breaker is powdered calcium hydroxide.

The granules are manufactured by charging the wax to a vessel, which has the capability of being heated to a temperature slightly above the melting point of the highest melting point wax present in the particular formula. Once the wax is melted, the base particulate is added while stirring is continued until the base is homogeneously dispersed within the molten wax. The liquid dispersion is then flaked on an appropriate "Flaker" and then ground to a specific particle size for use in the oil-based fracturing fluid. This particle size is typically less than 8 mesh (U.S. Sieve Series) and preferably between 14 to 60 mesh.

In operations, the granules are introduced into the gelled oil-based fracturing fluids and pumped down the well and into the formation. The calcium hydroxide is physically protected from the gelled hydrocarbons by the wax composition during the pumping operation. However, with time the temperature of the granules will rise to a level equal to the formation temperature. As the temperature of the granules approaches the melting point of the wax matrix, it becomes fluid (by melting or dispersing) to expose the calcium hydroxide powder. The calcium hydroxide chemically reacts with the gelled hydrocarbon causing the gelled structure to break. The viscosity of the oil is thereby reduced.

The granules are prepared by melting the wax and mixing the finely divided base until uniformly dispersed within the wax.

A wide variety of mixing vessels can be used as long as the vessel has the capability to melt the wax to a temperature slightly above its melting point and also the capability by means of some type of mixer to uniformly disperse the base into the molten wax. Once the powdered base is uniformly dispersed throughout the molten wax, this mixture is then pumped to a "Flaker" which is a piece of equipment that typically has a flat movable surface that is cooled to a temperature well below the hardening point of the wax mixture. The molten wax/base mixture is dispensed onto this cooled, moving surface where the wax/base mixture hardens into a flat, thin sheet. As this sheet of wax/base mixture leaves the "Flaker" it is broken into small flakes, hence the name Flaker. These flakes of wax/base mixture are then passed through a grinder and dispensed over various screens to separate the particles of the desired size for the finished product. Various types of grinding equipment can be used; however, the preferred type is a "hammer mill".

The composition of the granules, of course, will be tailored for specific applications to meet the needs of the treatment. The following are representative ranges and constituents of the granule.

|  | Wt % Broad Range | Wt % Preferred Range | Wt % Most Preferred Range |
|---|---|---|---|
| Wax | 40 to 90 | 50 to 85 | 65 to 80 |
| Powdered Calcium Hydroxide | 10 to 60 | 15 to 50 | 20 to 35 |

Following the grinding step, the particles may be classified by size (8 to 60 mesh, preferably 14 to 40 mesh) for the contemplated system.

(d) Operations

In carrying out the fracturing operations, the gelling agent, liquid hydrocarbons, basic aluminum compounds, solid additive (proppants), and breaker granules are blended in frac tanks at the well site, by either a batch, semi-continuous, or continuous process to produce the gelled hydrocarbon. Once the fracturing operations are begun, the gelled hydrocarbon suspension is pumped down the well bore at the desired formation fracturing pressure and out into the formation. The target formation may be kept under elevated pressure for up to several hours to promote further propagation of fractures. Therefore, it is desirable that the gelled hydrocarbon viscosity remain stable in the temperature range of 0 to 250 degrees F., depending on the actual formation temperature, for a length of time sufficient for the gelled hydrocarbons and proppant to be pumped into place.

Once the fracturing operation is complete, the pressure on the hydraulic fracturing fluid is released. The hydrocarbon liquid and formation fluid has now equilibrated to the formation temperature and the breaker granules begin to disperse or melt, exposing the base chemical to the gelled hydrocarbon. The time delay, of course, will depend on several factors, including the temperature of the formation, the melting point of the wax or wax blend used to formulate the breaker granules, the particle size of the breaker granules, and the loading (amount of breaker granules added to the gelled hydrocarbon) of the breaker granules.

Normally the treatment should be designed to provide a delay of 8 to 24 hours beginning with their introduction into the fracturing fluid. However, the effect of the breaker chemical preferably commences approximately forty-five minutes, and most preferably one hour, after introduction into the fluid, but this will only gradually reduce the viscosity of the fracturing fluid over the designed delay period. With some waxes, the wax begins to disperse in the hydrocarbon liquid before the temperature reaches the wax melting point.

The total amount of the breaker chemical incorporated within the fracturing fluid will primarily depend on the temperature of the formation and the desired time delay required before the viscosity of the fracturing fluid significantly begins to decrease.

The following represents a typical oil-based treating system of the present invention:

|  | Concentration in the Oil | |
|---|---|---|
|  | Preferred | Most Preferred |
| Phosphate ester gelling agent | 5–30 gptg[1] | 7–15 gptg |
| Sodium aluminate | 1–10 gptg | 1–3 gptg |
| Breaker granules | 10–40 pptg[2] | 15–30 pptg |

[1]gallons per thousand gallons
[2]pounds per thousand gallons

Alternate Embodiment

The present invention has been described in detail in connection with alkaline breaker chemicals. As noted above, the same principles and mechanisms are involved when using excess acid or acid anhydride breaker chemicals in the granules. Finely divided acid or acid anhydrides can be compounded with the wax(s) to form granules having the acid or acid anhydride dispersed therein in the manner described above.

Suitable acid or acid anhydride chemicals capable of breaking the alkyl phosphoric gelling agents include $C_3$–$C_{30}$ alkyl dianhydrides, aromatic acids (benzoic acid), acidic clays, maleic acid, anhydride copolymer, and p-toluene sulfonic acid, with benzoic acid being preferred.

The loading of the acid or mud anhydride in the wax granules may be within the ranges described above.

EXPERIMENTS

Example #1

Granules comprising a wax matrix with breaker particles dispersed therein were made with the following materials:

| Wax #1: | Paraflint H8 (marketed by Moore & Munger, Inc.) - Synthetic polymethylene wax, melting point approximately 220 degrees F. |
|---|---|
| Wax #2: | Paraflint C105 (marketed by Moore & Munger, Inc.) - Synthetic polymethylene wax, melting point approximately 195 degrees F. |
| Calcium Hydroxide | Powder |

The two waxes were first melted in a vessel and the calcium hydroxide powder was added and mixed until homogeneous. The total charge to the vessel was:

| Wax #1 | 35 wt. % |
|---|---|
| Wax #2 | 35 wt. % |
| Calcium Hydroxide | 30 wt. % |

After the mixture of melted wax and calcium hydroxide was homogeneous, the mixture was poured onto a flat cool surface to harden into a flat sheet. This sheet of hardened material was then broken into flakes and then ground and passed through two sieves to obtain a particle size range of 14 to 40 based on U.S. Standard Sieves.

Example #2
Gellation Procedure and Controlled Break
A gelled hydrocarbon was prepared as follows:
(a) 200 mls of kerosene was placed in a blender,
(b) 2.8 mls of alkyl phosphate ester was added to the blender with slow stirring.
(c) 1.26 mls of 17% potassium hydroxide was added to the blender and mixed at high speed for approximately 1 minute and 45 seconds.

Fifty-two mls of the above gelled kerosene was transferred to a sample cup of a Fann Model 50 Viscometer. To this sample cup containing the gelled kerosene was added 0.1768 gms of the breaker granules prepared in Example #1. The cup was installed on the Fann Model 50 Viscometer and the test was started. The viscometer was operated at 100 rpm and the temperature was increased to 200 degrees F. and held for two hours. This test was run in duplicate and the results are illustrated on the graph. The beginning viscosity of the gelled kerosene in both tests was approximately 600 cps. At 55–60 minutes into the tests the viscosity began to decrease. At 100–110 minutes into the test the viscosity of both samples dropped below 100 cps. One hundred cps is the viscosity at which the gelled hydrocarbon will no longer suspend the proppant. The viscosity of both samples continued to decrease to approximately 20 cps. The Example #2 data are presented in Table I and graphically presented in FIG. 1.

TABLE 1

| Time (Min) | Viscosity (Granules) | Temperature (F.) | Viscosity (Ca(OH)$_2$) | Temperature (F.) |
| --- | --- | --- | --- | --- |
| 0 | 550 | 75 | 324 | 72 |
| 10 | 548 | 166 | 181 | 157 |
| 20 | 548 | 191 | 118 | 185 |
| 30 | 583 | 193 | 45 | 199 |
| 40 | 596 | 198 | 29 | 200 |
| 50 | 608 | 201 | 21 | 200 |
| 60 | 570 | 203 | 14 | 209 |
| 80 | 285 | 202 | 17 | 200 |
| 109 | 100 | 201 | 17 | 200 |
| 160 | 40 | 150 | 7 | 99 |

This data and FIG. 1 demonstrate that the breaker formulation prepared in Example #1 gives a significant delayed break at 200 degrees F. compared to 100% calcium hydroxide. The calcium hydroxide reduces the viscosity of gelled kerosene to below 100 cps in approximately 22 minutes. The Example #1 breaker delays this viscosity decrease to approximately 100 minutes.

Example #3
Granules comprising a wax matrix with breaker particles dispersed therein were made with the following materials:

| | |
| --- | --- |
| Wax #3 | HP-9057 (marketed by HP Wax of Arlington Heights, IL) - Synthetic polyethylene wax, melting point approximately 220 degrees F. |
| Breaker Particles | Calcium Hydroxide - Powder |

The wax was first melted in a vessel and the calcium hydroxide powder is added and mixed until homogeneous. The total charge to the vessel was:

| | |
| --- | --- |
| Wax #3 | 70 wt % |
| Calcium Hydroxide | 30 wt % |

After the melted wax and calcium hydroxide was homogeneous, the mixture was poured onto a flat cool surface to harden into a flat sheet. This sheet of hardened material was then broken into flakes and then ground and passed through two sieves to obtain a particle size range of 14 to 40 based on U.S. Standard Sieve.

Example #4
Gellation Procedure and Controlled Break
Granules comprising a wax matrix with breaker particles dispersed therein were made with the following materials:
A gelled hydrocarbon was prepared as follows:
(d) 200 mls of kerosene was placed in a blender,
(e) 1.6 mls of alkyl phosphate ester was added to the blender with slow stirring,
(f) 0.72 mls of 17% potassium hydroxide was added to the blender and mixed at high speed for approximately 1 minute and 45 seconds.

Fifty-two mls of the above gelled kerosene was transferred to a sample cup of a Fann Model 50 Viscometer. To this sample cup containing the gelled kerosene was added 0.176 gms of the breaker granules prepared in Example #3. The cup was installed on the Fann Model 50 Viscometer and the test was started. The viscometer was operated at 100 rpm and the temperature was increased to 175 degrees F. and held for two hours. At 55–60 minutes into the tests, the viscosity began to decrease. At 100–110 minutes into the test, the viscosity dropped below 100 cps. One hundred cps is the viscosity at which the gelled hydrocarbon will no longer suspend the proppant. The viscosity continued to approximately 20 cps. The Example #4 data are presented in Table 2 and illustrated in FIG. 2.

TABLE 2

| Time (Min) | Viscosity (Granules) | Temperature (F.) | Viscosity (Ca(OH)$_2$) | Temperature (F.) |
| --- | --- | --- | --- | --- |
| 0 | 287 | 74 | 239 | 75 |
| 10 | 249 | 134 | 217 | 126 |
| 20 | 245 | 155 | 153 | 165 |
| 30 | 247 | 168 | 34 | 173 |
| 40 | 296 | 175 | 14 | 175 |
| 50 | 183 | 179 | 14 | 175 |
| 60 | 114 | 175 | 8 | 175 |
| 80 | 73 | 176 | 8 | 176 |
| 100 | 58 | 175 | 9 | 175 |
| 150 | 29 | 175 | 0 | 106 |

Figure 2:
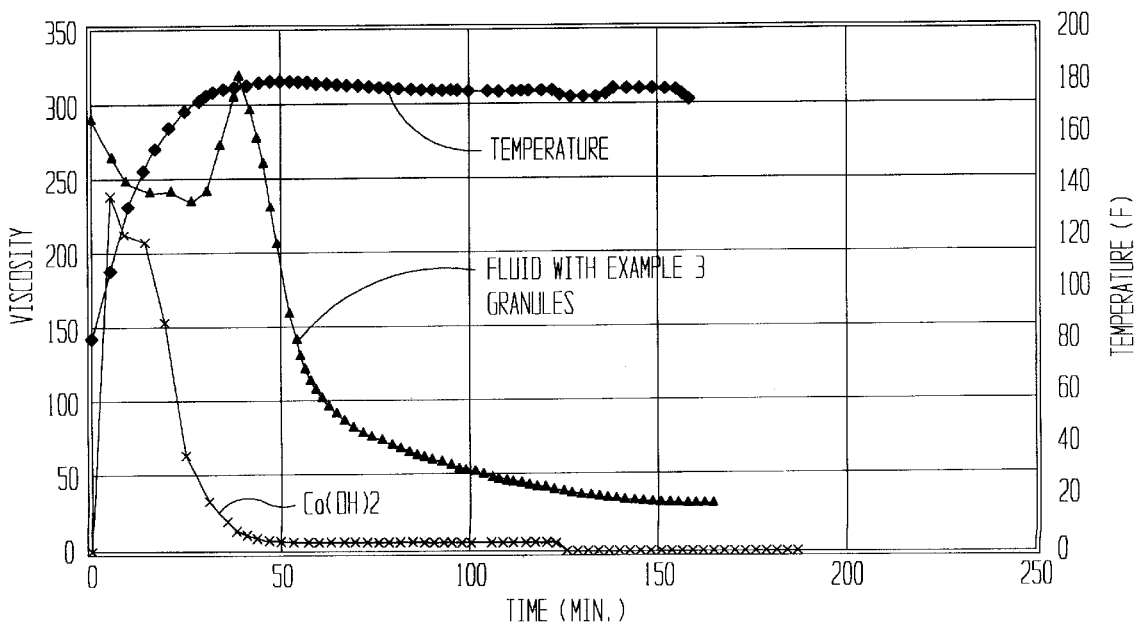

The Table 2 data and FIG. 2 demonstrate that the breaker formulation prepared in Example #3 gives a significant delayed break at 175 degrees F. compared to 100% calcium hydroxide. The calcium hydroxide powder reduces the viscosity of gelled kerosene to below 100 cps In approximately 25 minutes. The Example #3 granules delay the viscosity decrease to approximately 60 minutes.

Example #5
Gellation Procedure and Controlled Break
A gelled hydrocarbon was prepared as follows:
(g) 200 mls of kerosene was placed in a blender,
(h) 2.0 mls of alkyl phosphate ester was added to the blender with slow stirring,
(i) 0.90 mls of 17% potassium hydroxide was added to the blender and mixed at high speed for approximately 1 minute and 45 seconds.

Fifty-two mls of the above gelled kerosene was transferred to a sample cup of a Fann Model 50 Viscometer. To this sample cup containing the gelled kerosene was added 0.176 gms of the breaker granules prepared in Example #1. The cup was installed on the Fann Model 50 Viscometer and the test was started. The viscometer was operated at 100 rpm and the temperature was increased to 225 degrees F. and held for two hours. The beginning viscosity of the gelled kerosene in both tests was approximately 600 cps. At 55–60 minutes into the tests, the viscosity began to decrease. At 100–110 minutes into the test, the viscosity dropped below 100 cps. One hundred cps is the viscosity at which the gelled hydrocarbon will no longer suspend the proppant. The viscosity continued to decrease to approximately 20 cps. The Example #5 data are presented in Table 3 and graphically illustrated in FIG. 3.

TABLE 3

| Time (Min) | Viscosity (Granules) | Temperature (F.) | Viscosity (Ca(OH)$_2$) | Temperature (F.) |
| --- | --- | --- | --- | --- |
| 0 | 511 | 77 | 604 | 75 |
| 10 | 315 | 157 | 407 | 155 |
| 20 | 289 | 189 | 54 | 201 |
| 30 | 265 | 204 | 29 | 220 |
| 40 | 176 | 216 | 27 | 225 |
| 50 | 104 | 225 | 27 | 225 |
| 60 | 33 | 225 | 27 | 225 |
| 80 | 16 | 225 | 27 | 225 |
| 100 | 14 | 225 | 29 | 225 |
| 170 | 38 | 100 | 29 | 100 |

Figure 3:
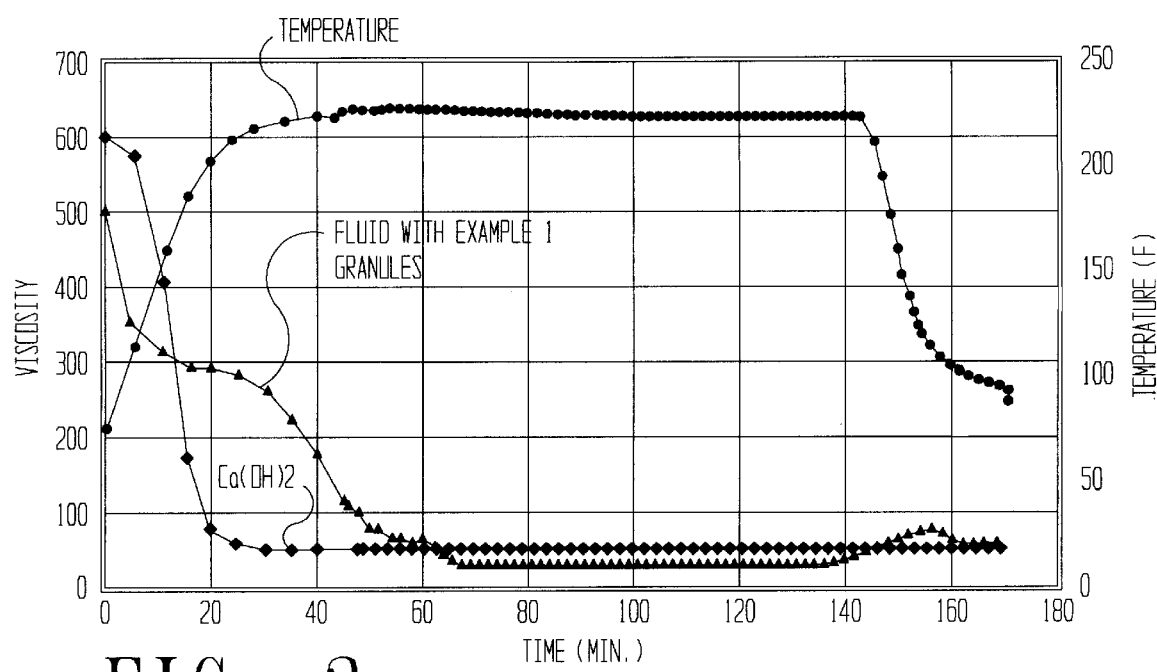

Table 3 data and FIG. 3 demonstrate that the breaker formulation prepared in Example #1 gives a significant delayed break at 225 degrees F. compared to 100% calcium hydroxide. The calcium hydroxide powder reduced the viscosity of gelled kerosene to below 100 cps in approximately 18 minutes. The Example #1 breaker delayed this viscosity decrease to approximately 49 minutes.

Example #6

Gellation Procedure and Controlled Break

A gelled hydrocarbon was prepared as follows:

(j) 200 mls of kerosene was placed in a blender, (k) 2.0 mls of alkyl phosphate ester was added to the blender with slow stirring, (l) 1.26 mls f 17% potassium hydroxide was added to the blender and mixed at high speed for approximately 1 minute and 45 seconds.

Fifty-two mls of the above gelled kerosene was transferred to a sample cup of a Fann Model 50 Viscometer. To this sample cup containing the gelled kerosene was added 0.176 gms of the breaker granules prepared in Example #1. The cup was installed on the Fann Model 50 Viscometer and the test was started. The viscometer was operated at 100 rpm and the temperature was increased to 235 degrees F. and held for two hours. At 55–60 minutes into the tests, the viscosity began to decrease. At 100–110 minutes into the test, the viscosity dropped below 100 cps. One hundred cps is the viscosity at which the gelled hydrocarbon will no longer suspend the proppant. The viscosity continued to decrease approximately 20 cps. The Example #6 data are presented in Table 4 and illustrated in FIG. 4.

TABLE 4

| Time (Min) | Viscosity (Granules) | Temperature (F.) | Viscosity (Ca(OH)$_2$) | Temperature (F.) |
| --- | --- | --- | --- | --- |
| 0 | 752 | 77 | 604 | 75 |
| 10 | 567 | 142 | 407 | 155 |
| 20 | 374 | 215 | 54 | 201 |
| 30 | 245 | 232 | 29 | 220 |
| 40 | 173 | 240 | 27 | 225 |
| 50 | 135 | 240 | 27 | 225 |
| 60 | 112 | 235 | 27 | 225 |
| 80 | 100 | 235 | 27 | 225 |
| 100 | 92 | 235 | 29 | 225 |
| 170 | 38 | 159 | 29 | 100 |

Figure 4:
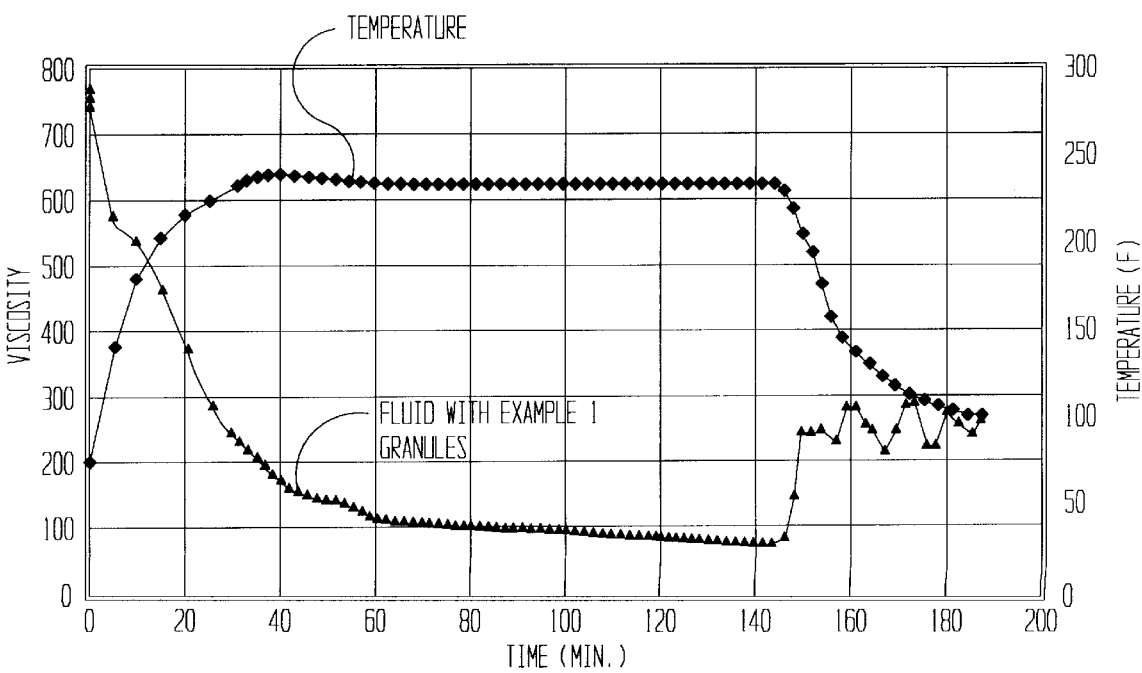

The Table 4 data and FIG. 4 demonstrate that the breaker formulation prepared in Example #1 gives a significant delayed break at 235 degrees F. compared to 100% calcium hydroxide. The calcium hydroxide powder reduced the viscosity of gelled kerosene to below 100 cps in less than 20 minutes. The coated breaker prepared in Example #1 delayed this viscosity decrease to approximately 80 minutes.

Release Mechanism

It was originally believed that the release of the breaker (Ca(OH)$_2$) occurred at or near the melting point of the wax employed. A review of the data, especially the graphs, reveals that other mechanisms may be involved. In many of the tests, the viscosity appeared to break at a temperature below the melting point of the wax.

As shown in FIG. 1, the base fluid (gelled kerosene) exhibits a viscosity decrease with temperature increase, typical of hydrocarbons. Incipient viscosity break occurs upon the initial reaction of the breaker chemical with the gelling agent, and occurs on the release of the chemical from the wax matrix granules. This reaction reduces the fluid viscosity much more than would be expected from temperature increase. FIG. 1 shows that the initial breaker release occurred at about 60 minutes at a temperature of about 191 degrees F.

FIGS. 3 and 4, however, indicate a chemical release at a much lower temperature.

Additional tests were carried out to determine what other mechanisms may be involved in the release of the breaker chemicals. A beaker containing kerosene and a stir bar was placed in a water bath on a heated stir plate. A portion of sample from Examples #1 and 3 was placed in separate containers. The temperature of the kerosene was gradually increased while stirring the kerosene. Visual observations were made as to the state of the breaker particles as the temperature increased.

The wax used in both breaker formulations (Example #1 and 3) do not appear to be soluble in the kerosene. However, they are dispersible and actually begin to disperse below the reported melting point of the wax. As the wax disperses, the kerosene became cloudy and remained cloudy, even as the kerosene cooled. When the stirrer was stopped, the cloudy portion settled into a layer at the bottom of the beaker. In fact, Example #1, which contains two waxes, settled into two different layers indicating that the two waxes have slightly different dispersion characteristics. If the samples were soluble, they would form a clear, homogeneous solution that would not separate.

The wax blend used in Example #1 begins to disperse at approximately 180–185 degrees F. The wax used in Example #3 begins to disperse at approximately 150–155 degrees F. Even though the reported melting point of this wax is similar to that of one used in Example #1, it begins to disperse at a lower temperature. Hence the reason why the wax from Example #3 would not perform at the higher testing temperatures.

In conclusion, the performance of the delayed breaker is controlled by a combination of the melting point range and dispersibility characteristics of the waxes.

The experiments reveal that the principal breaker mechanism is due to wax melting or dispersion. However, during operations, other mechanisms may be involved, such as granule deformation or crushing.

What is claimed is:

1. In the method of fracturing a subterranean formation wherein a hydrocarbon liquid gelled with a pH sensitive alkyl phosphate ester gelling agent is pumped from the surface down a wellbore and into the formation, the improvement wherein the hydrocarbon liquid has dispersed therein granules comprising:

(a) from about 40 to about 90 weight % of a matrix of a substantially oil-insoluble Fischer-Tropsch wax; and (b) from about 10 to about 60 weight % of a powdered acid or powdered base breaker chemical dispersed in the wax matrix, the temperature of the subterranean formation being sufficiently high to cause the breaker chemical to be released from the wax matrix.

2. The method of claim 1 wherein the chemical is a base chemical and the granules are 8 mesh or smaller.

3. The method of claim 2 wherein the alkyl phosphate ester is a diester and the alkyl groups thereof each having from 6 to 10 carbon atoms.

4. The method of claim 2 wherein the amount of base chemical is such to degrade or destroy the gelled structure of the hydrocarbon and reduce its viscosity.

5. The method of claim 2 wherein the base chemical is selected from a group consisting of particulate calcium hydroxide, sodium bicarbonate, magnesium oxide, urea and sodium carbonate, and mixtures thereof.

6. The method of claim 5 wherein the base chemical is powdered calcium hydroxide.

7. The method of claim 2 wherein the melting or dispersion of the wax at formation temperature releases the chemical to react with the base chemical to reduce the viscosity of the hydrocarbon liquid over a period of about at least 60 minutes.

8. The method of claim 1 wherein the breaker chemical is a base selected from the group consisting of calcium hydroxide and calcium oxide.

9. The method of claim 8 wherein the Fischer-Tropsch wax has a melting point of from about 175° F. to about 250° F.

10. The method of claim 8 wherein the breaker chemical comprises from 20 to 35 wt. % of the granules.

11. The method of claim 8 wherein the Fischer-Tropsch wax is a blend of two Fischer-Tropsch waxes having different melting points.

12. A method of fracturing a subterranean formation with an oil-based fracturing fluid which comprises:

(a) gelling a liquid by adding an alkyl phosphate ester gelling agent to the hydrocarbon liquid;

(b) adding an aluminum compound to the liquid hydrocarbon to react with the gelling agent and form a salt of the alkyl phosphate ester which gels the hydrocarbon liquid;

(c) adding a proppant to the gelled hydrocarbon which is carried into and placed in the fracture by the gelled hydrocarbon fluid;

(d) adding free flowing granules having an average particle size of 8 mesh or smaller to the hydrocarbon liquid, said granules comprising from 65 to 80 wt. % of a substantially oil-insoluble Fischer-Tropsch wax matrix having a melting point between about 175° F. and about 230° F., said matrix having dispersed therein 20 to 35 wt. % of a powdered base compound capable of breaking the gelled structure of a salt of an alkyl phosphate ester, said wax releasing the base compound at formation temperature;

(e) pumping the gelled hydrocarbon liquid containing the granules into the formation at a rate and pressure sufficient to form a fracture therein; and (f) shutting the well whereby the temperature of the formation causes part or all of the wax to release the base compound to react with the salt of the alkyl phosphate ester to reduce the viscosity of the gelled hydrocarbon liquid.

13. The method of claim 12 wherein the delayed release of the base compound commences at a time period of not less than 45 minutes after introduction into the liquid hydrocarbon and continues until most or all of the base compound is released into the hydrocarbon liquid.

14. The method of claim 12 wherein the wax releases the base compound as a result of wax melting or wax dispersion in the fracturing fluid at formation temperature.

15. The method of claim 12 wherein the release of the base compound is at a rate sufficiently slow to permit the proppant to be placed in the fracture.

16. The method of claim 12 wherein the wax is a blend of two Fischer-Tropsch waxes having different melting points.

* * * * *